Figure 1:
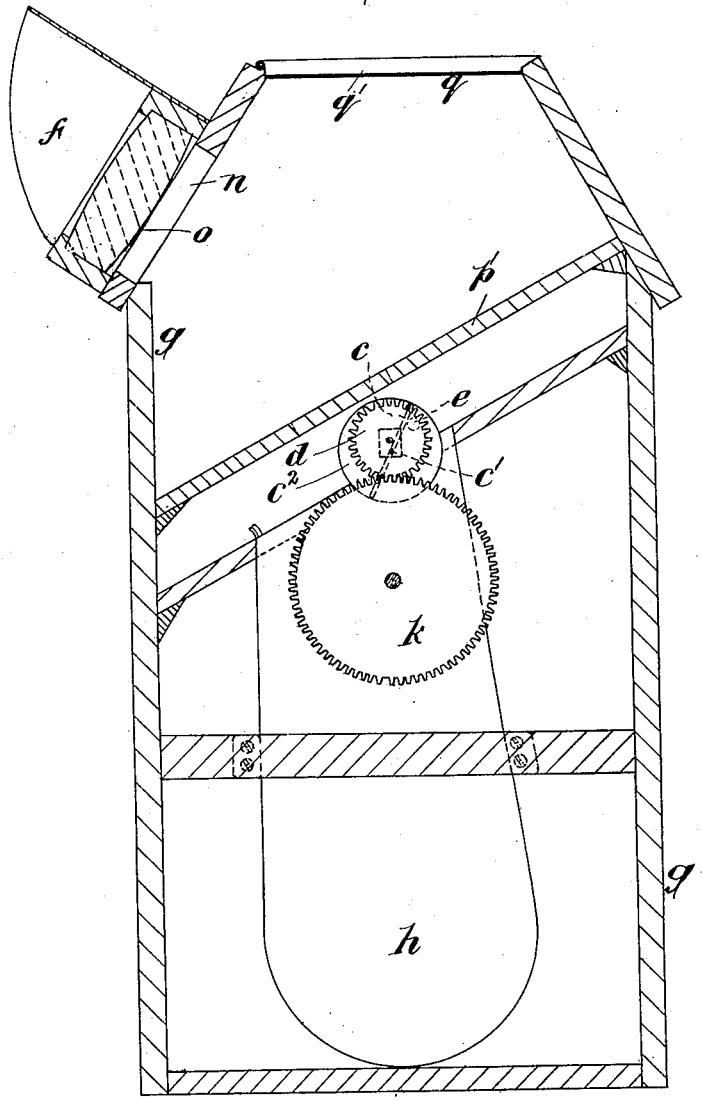

No. 654,585. Patented July 31, 1900.
T. ANSBORO.
APPARATUS FOR PRESENTING LIVING PICTURES TO THE EYE.
(Application filed Apr. 15, 1899.)
(No Model.) 4 Sheets—Sheet 1.

No. 654,585. Patented July 31, 1900.
T. ANSBORO.
APPARATUS FOR PRESENTING LIVING PICTURES TO THE EYE.
(Application filed Apr. 15, 1899.)
(No Model.) 4 Sheets—Sheet 2.
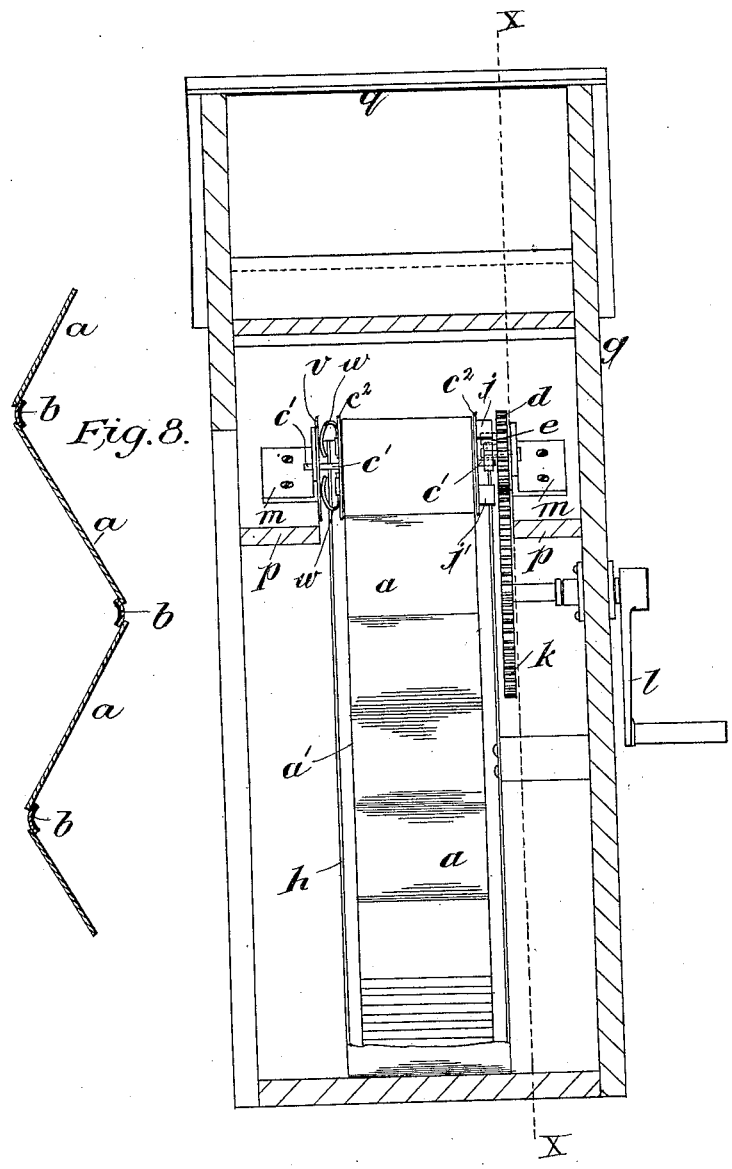

No. 654,585. Patented July 31, 1900.
T. ANSBORO.
APPARATUS FOR PRESENTING LIVING PICTURES TO THE EYE.
(Application filed Apr. 15, 1899.)
(No Model.) 4 Sheets—Sheet 3.
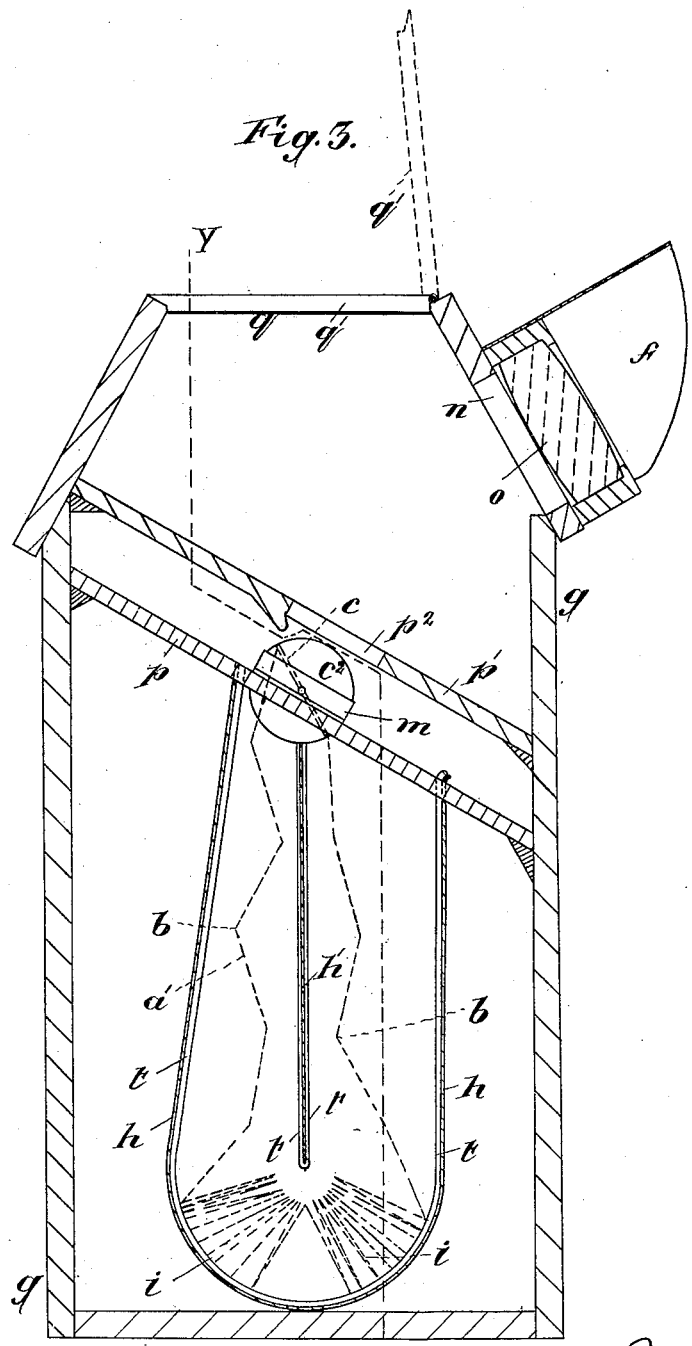

No. 654,585. Patented July 31, 1900.
T. ANSBORO.
APPARATUS FOR PRESENTING LIVING PICTURES TO THE EYE.
(Application filed Apr. 15, 1899.)
(No Model.) 4 Sheets—Sheet 4.
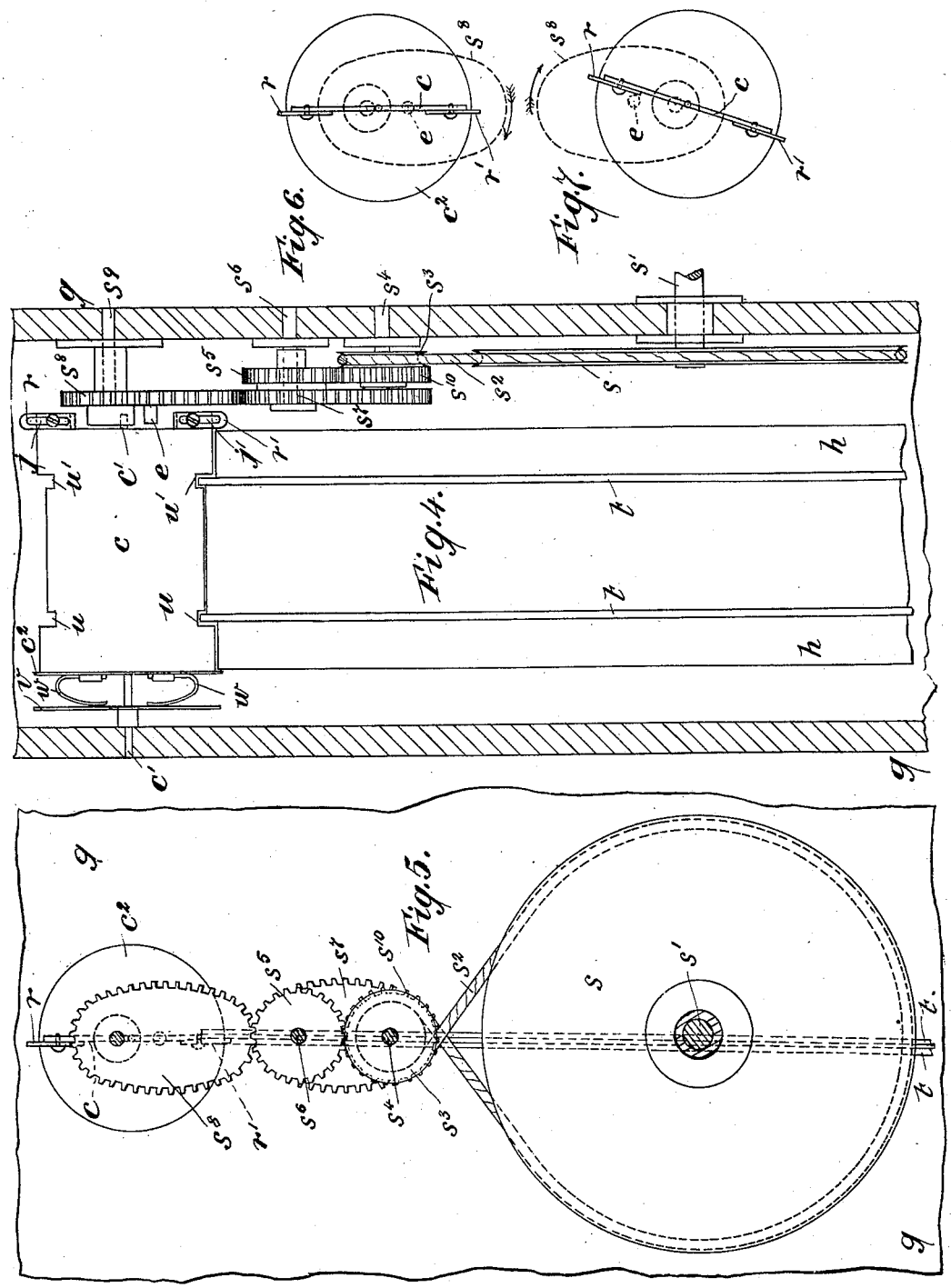

UNITED STATES PATENT OFFICE.

THOMAS ANSBORO, OF GLASGOW, SCOTLAND, ASSIGNOR OF ONE-HALF TO JOHN FAIRIE, OF SAME PLACE.

APPARATUS FOR PRESENTING LIVING PICTURES TO THE EYE.

SPECIFICATION forming part of Letters Patent No. 654,585, dated July 31, 1900.

Application filed April 15, 1899. Serial No. 713,153. (No model.)

*To all whom it may concern:*

Be it known that I, THOMAS ANSBORO, gentleman, a subject of the Queen of Great Britain, residing at 4 Playfair street, Glasgow, Scotland, have invented certain new and useful Apparatus for Presenting Living Pictures to the Eye, of which the following is a specification.

This invention relates to instruments of the kinetoscope class wherein so-called "living pictures" are presented to the eye; and it has for its object to improve the construction of such instruments. In the instruments of the aforesaid class a number of pictures taken in series and representing the different attitudes successively assumed by an object in performing any act from its beginning to its close is rapidly presented to the eye, with the result that the persistence of vision produces an apparently living picture.

The drawings annexed illustrate two modifications of my invention. One modification is shown at Figures 1 to 3. Fig. 1 is a vertical section taken on the line $x\,x$, Fig. 2; Fig. 2, a transverse vertical section taken on the line $y\,y$ of Fig. 3, and Fig. 3 is a vertical section taken at the opposite side of the instrument from that at Fig. 1. The other modification is shown at Figs. 4 and 5, Fig. 4 being a sectional elevation and Fig. 5 a side view of the mechanism Fig. 4. Figs. 6 and 7 are views explaining the action of the mechanism. Fig. 8 is a fragmentary longitudinal sectional view of the endless band of pictures.

On the drawings the same reference-letters wherever repeated indicate the same or similar parts.

In my invention the series of pictures $a$ to be presented to the eye are arranged in the form of an endless band $a'$, each picture being jointed to its neighbor in the band by means of a flexible joint $b$, such flexible or elastic joints being arranged alternately on opposite sides of the band in order to render the endless band readily foldable in sections corresponding to the length of the pictures. The flexible joints may be coated alternately on alternate sides with an elastic substance, such as india-rubber, to give the band a tendency to fold automatically in a V fashion, as shown at Fig. 3. By means of a revolving plate $c$, which receives intermittent motion from an eccentrically-arranged wheel $d$, provided with means, such as a pin $e$, for actuating the plate, each picture is presented before an eye-hole $n$ in the case $g$ of the instrument for a brief interval of time and is then suddenly turned over and its place taken by the next succeeding picture in the band. As the pictures in the band fall down from the plate $c$ aforesaid they fold up automatically (see dotted lines at $i$, Fig. 3) within a guide casing or chamber $h$, which is preferably of a U shape, with a central division or partition $h'$.

The revolving plate $c$ has its axle $c'$, to which it is rigidly secured, carried by the brackets $m$, and, as will be clearly seen from Fig. 1, the said axle $c'$ is out of the center of the wheel $d$. The result of this is that as the wheel revolves its projecting pin $e$ alternately engages itself with and releases itself from the projections $j\,j'$, provided for the purpose on the plate and which are equidistant from the center of its axle, so as to impart to the plate the intermittent motion. The wheel $d$ can be kept continuously in motion by means of suitable mechanism, such as the gear-wheel $k$, operated by the turning of a handle $l$ or by clockwork.

The pictures can be viewed through a single opening $n$, provided with a magnifying-lens $o$, or when the series of pictures in the band are in duplicate they can be viewed stereoscopically through two openings, one for each eye.

$p$ is a strengthening cross-board, to which the casing $h$ can be secured at its upper end.

$p'$ is a cover with an opening $p^2$ at the center, through which the pictures can be seen as they are presented by the plate $c$.

$q$ is an opening at the upper end of the instrument and which is provided with a hinged lid $q'$, capable of being raised to the proper angle (see dotted lines, Fig. 3) to serve as a reflector for throwing light upon the pictures.

For the purpose of keeping the pictures in place as they are revolved the plate is provided at each end with metallic disks $c^2$.

In the arrangement Figs. 5 and 6 the plate $c$, mounted rigidly on its axle $c'$, has its projections $j\,j'$ provided with escapement-pieces $r$ $r'$, each of which is slotted and is capable of being adjusted in position upon the projections by means of the screws. The mechanism for revolving the plate consists of a driving-pulley $s$ on the axle $s'$ and from which passes a cord $s^2$ to the small pulley $s^3$ on the spindle $s^4$. Made in one with the pulley $s^3$ is a toothed wheel $s^{10}$, which gears with a toothed wheel $s^5$ on spindle $s^6$, made one with an elliptical wheel $s^7$, which latter gears with the elliptical wheel $s^8$, turning upon the spindle $s^9$. The pin $e$, inserted in the elliptical wheel $s^8$, is capable of engaging once in each revolution with one of the escapement-pieces $r$ $r'$. As will be seen, the axle of the plate $c$ is journaled eccentrically with the wheel $s^8$. As is clearly shown at Figs. 5 and 6, owing to this eccentric arrangement the pin $e$ will be caused once in each revolution of the wheel $s^8$ to engage one of the escapements, (see Fig. 7,) with the result that the plate will be turned over—that is, moved through half a revolution—and then release itself from the escapement and pass around free of the other escapement. (See Figs. 4 and 6.) As the movement of the pin $e$ in its path is faster or slower according as the longest or shortest radius of the wheel $s^8$ is in line (through the gearing of the wheels) with the shortest or longest radius of the wheel $s^7$ the pin and these variable movements are adjusted so that the former will be engaged with the plate $c$ during its maximum movement and released therefrom when its movement is at a minimum, thereby insuring that each picture as it is moved forward in succession by the plate remains at rest for a much longer time than it takes to make the change from one picture to another.

In order that the friction on the flexible joints due to the movement of the band may be reduced to a minimum, the band in its path of movement rubs only on two wire rails $t$ $t'$, placed around the interior of the chamber $h$ at a distance apart corresponding to that between the two deep indents $u$ $u'$ on each edge of the picture-plate. The middle partition of the chamber $h$ being similarly furnished has both wires prolonged at the top into the indents on the edge of the plate, so that the plate in revolving passes by them, like a comb, without actually touching, and so prevents any possibility of the band being caught during its movement between the upper part of the partition and the edge of the plate. To facilitate the movement of the band from front to rear at the bottom of the chamber, the latter is there formed with a curve that may be either circular or cycloidal.

$w$ $w$ are bent springs attached to the disk $c^2$ of the picture-plate and which bear against the fixed disk $v$ and so act as brakes.

The pictures may be illuminated by an electric light or otherwise in any usual manner.

Having now fully described my invention, what I claim, and desire to secure by Letters Patent, is—

1. In an apparatus for presenting so-called "living pictures" to the eye, the combination with an endless band composed of a series of pictures flexibly jointed to one another and such flexible joints arranged alternately on opposite sides of the band in order to render the endless band automatically foldable when moved at a high rate of speed, of means for giving an intermittent movement to the endless band whereby each picture is presented to the eye for a brief period while at rest, substantially as set forth.

2. In an apparatus for presenting so-called "living pictures" to the eye, the combination with an endless band composed of a series of pictures flexibly jointed to one another and such flexible joints arranged alternately on opposite sides of the band in order to render the endless band automatically foldable when moved at a high rate of speed, of a revolving plate around which the flexibly-jointed band passes, and means for imparting an intermittent movement to the plate, substantially as set forth.

3. In an apparatus for presenting so-called "living pictures" to the eye, the combination with an endless band composed of a series of pictures flexibly jointed to one another and such flexible joints arranged alternately on opposite sides of the band in order to render the endless band automatically foldable when moved at a high rate of speed, of a revolving plate provided with projections and around which plate the flexibly-jointed band passes, an axle for the plate, a driving-wheel whose center is eccentric to the axle of the plate and provided with a pin, and means for imparting motion to said driving-wheel, substantially as set forth.

4. In an instrument for presenting so-called "living pictures" to the eye, the combination of an endless band of pictures each of which is jointed to its neighbor, a revolving plate around which the band passes, projections on the plate, adjustable pieces fitted on the projections, means for clamping the adjustable pieces in place, an axle for the plate, a driving-wheel whose center is eccentric of the axle of the plate, a pin on the driving-wheel and means for rotating the driving-wheel, substantially as set forth.

5. In an instrument for presenting so-called "living pictures" to the eye the combination of an endless band of pictures each of which is jointed to its neighbor, a revolving plate around which the band passes, projections on the plate, an axle for the plate, a driving-wheel whose center is eccentric of the axle of the plate, a pin on the driving-wheel, means for rotating the driving-wheel, a disk $v$ on the axle of the plate and friction brake-springs secured to the plate and bearing against the disk, substantially as hereinbefore set forth.

6. In an instrument for presenting so-called "living pictures" to the eye, the combination of an endless band of pictures, means for flexibly jointing the pictures to each other so that they can fold up, a plate for revolving the band, means for actuating the plate, a guideway for the pictures having a central partition and a curved lower end, rails in the guideway and recesses or indents in the plate into which the upper ends of the rails project, substantially as hereinbefore set forth.

7. In an instrument for presenting so-called "living pictures" to the eye the combination of an endless band of pictures each of which is jointed to its neighbor, a revolving plate around which the band passes, projections on the plate, an axle for the plate an elliptical driving-wheel, a pin on the driving-wheel, a second elliptical wheel gearing with the first one and means for driving this second wheel, substantially as hereinbefore set forth.

8. The combination of the endless band $a$, the guideway $h$ for the band, the revoluble plate $c$, the projections $j$, $j'$, on the plate, the axle $c'$ around which the plate revolves, the driving-gear, the pin $e$ actuated by the driving-gear and the means for operating the gear, substantially as hereinbefore set forth.

9. An endless band consisting of a series of pictures jointed one to another in a flexible manner and with such joints arranged alternately on opposite sides of the band and coated with an elastic substance to impart to the band a tendency to fold automatically when moved at a high rate of speed, substantially as set forth.

Signed at Glasgow, Scotland, this 5th day of April, 1899.

THOMAS ANSBORO. [L. S.]

Witnesses:
ALEXANDER NOBLE,
FRED. LEWIS.